United States Patent [19]
Nilsson

[11] 3,920,361
[45] Nov. 18, 1975

[54] GEAR ARRANGEMENT FOR MAINTAINING CONTINUOUS CONTACT BETWEEN FLANKS OF A POWER ROTOR AND COOPERATING SEALING MEANS ON AN ABUTMENT MEMBER IN A ROTARY COMBUSTION ENGINE

[75] Inventor: Hans Robert Nilsson, Ektorp, Sweden

[73] Assignee: Svenska Rotor Maskiner Altiebolag, Nacka, Sweden

[22] Filed: Jan. 16, 1974

[21] Appl. No.: 433,751

[30] Foreign Application Priority Data
Jan. 17, 1973   United Kingdom.................. 2504/73

[52] U.S. Cl. .............................................. 418/191
[51] Int. Cl.² ...................... F01C 1/08; F01C 19/00
[58] Field of Search .............. 418/191, 198; 74/409; 123/8.47

[56] References Cited
UNITED STATES PATENTS

| | | | |
|---|---|---|---|
| 1,124,107 | 1/1915 | Bogatti | 74/409 |
| 3,468,294 | 9/1969 | Nilsson | 418/191 |
| 3,664,778 | 5/1972 | Nilsson | 418/191 |

Primary Examiner—C. J. Husar
Assistant Examiner—L. T. Casaregola
Attorney, Agent, or Firm—Flynn & Frishauf

[57] ABSTRACT

Rotary internal combustion engine comprising two intermeshing rotors provided with synchronizing means comprising two gear transmissions of somewhat different gear ratios. Three gear wheels are non-rotatably connected with the coaxial rotors and the fourth gear wheel is connected with the coaxial rotors through a friction clutch.

4 Claims, 4 Drawing Figures

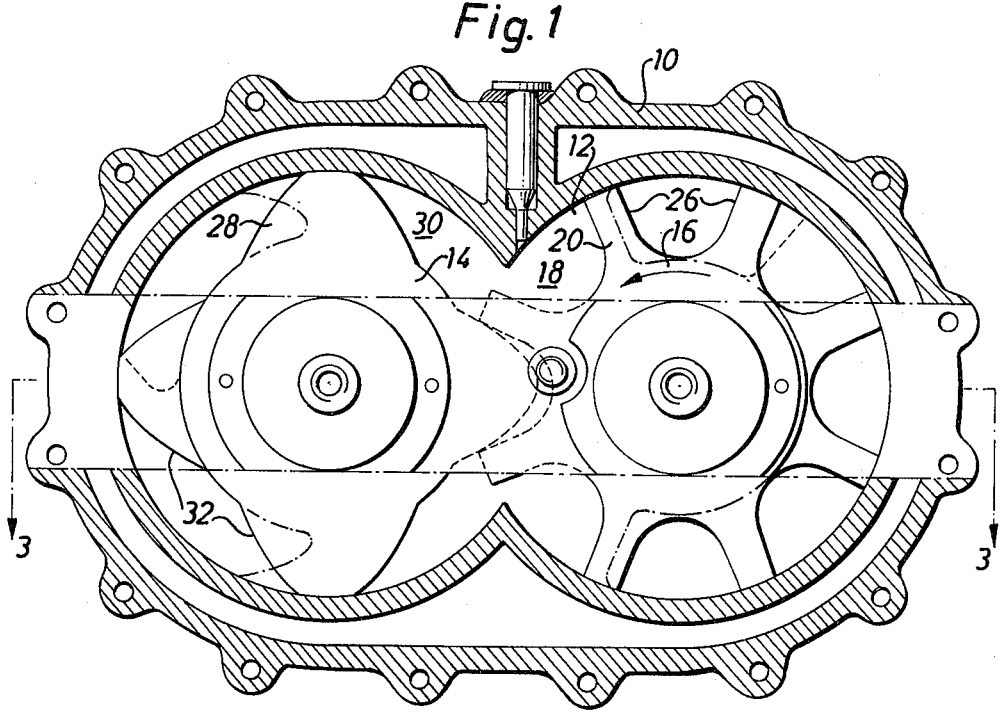
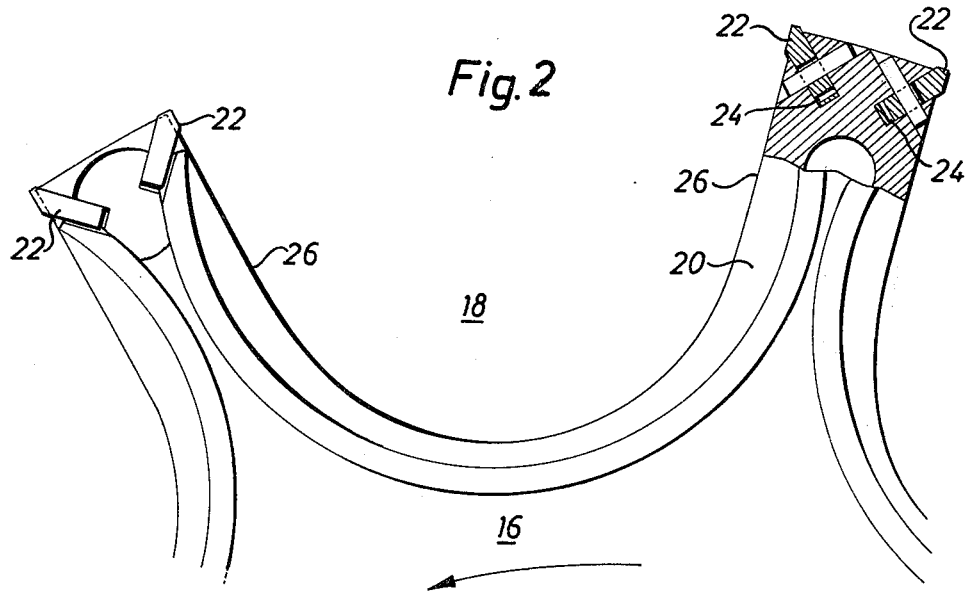

GEAR ARRANGEMENT FOR MAINTAINING CONTINUOUS CONTACT BETWEEN FLANKS OF A POWER ROTOR AND COOPERATING SEALING MEANS ON AN ABUTMENT MEMBER IN A ROTARY COMBUSTION ENGINE

BACKGROUND OF THE INVENTION

This invention relates to synchronizing means for the rotors in a machine of the type comprising two intermeshing grooved rotors. In such a machine, a first rotor is non-rotatably connected with a power shaft transmitting all the torque of the machine, whereas the second rotor is subjected to a periodically varying torque, which at least in one direction has small amplitudes from the zero torque value. Machines of this type have been provided with a synchronizing gear transmission comprising one gear non-rotatably connected with each rotor, said transmission having exactly the same gear ratios as the rotors connected therethrough and a considerably smaller back-lash than that between the rotors. The oscillations between the rotors have in this way been restricted to the amplitudes set by the backlash of the synchronizing gears so that the rotors have always been kept out of direct flank contact with each other. In spite of the fact that the power transmitted through the synchronizing gears is extremely small the flanks of the gear teeth have in some instances been worn and in extreme cases even the teeth of the gears have broken.

Special problems have appeared in machines of the above type acting as internal combustion engines, in which the first rotor is shaped as a power rotor connected with the power output shaft and the second rotor is shaped as a rotary abutment member carrying movable sealing means positively contacting the flanks of the power rotor lands. In such machines the synchronizing gears have successfully prevented direct contact between the rotor bodies but have not been able to completely eliminate motion between the sealing means and the rotor in which they are carried. The sealing means have thus been brought into an oscillation relative to the carrying rotor so that the direct contact with the other rotor takes place only periodically, i.e. the contact sealing function has been interrupted resulting in considerable leakage losses.

The aim of the present invention is to modify the synchronizing transmission in such a way that the contact between the synchronizing gears will continuously take place only on one and the same flank of each gear teeth so that the rotors all the time are kept in one and the same angular relation to each other. In spite of the fact that the contact pressure between the synchronizing gears in this way will be somewhat higher than in normal synchronizing gears the fact that there is no impact between the gears eventually resulting in pitting of the gear flanks means that wear of the gears can be practically eliminated. Furthermore as the rotors thus do not oscillate relative each other the sealing means in an internal combustion engine will never be brought into oscillation relative to the carrying rotor which in turn means that the sealing means will be kept in continuous sealing contact with the flanks of the power rotor so that the sealing function therewith consequently is very considerably improved.

BRIEF DESCRIPTION OF THE DRAWINGS

The invention will now be described more in detail in connection with the preferred embodiments thereof shown in the accompanying drawings, in which:

FIG. 1 shows a transverse section through an internal combustion engine according to the invention, FIG. 2 shows a detail of FIG. 1 on a larger scale.

DETAILED DESCRIPTION OF ILLUSTRATED EMBODIMENTS

Figure 3:
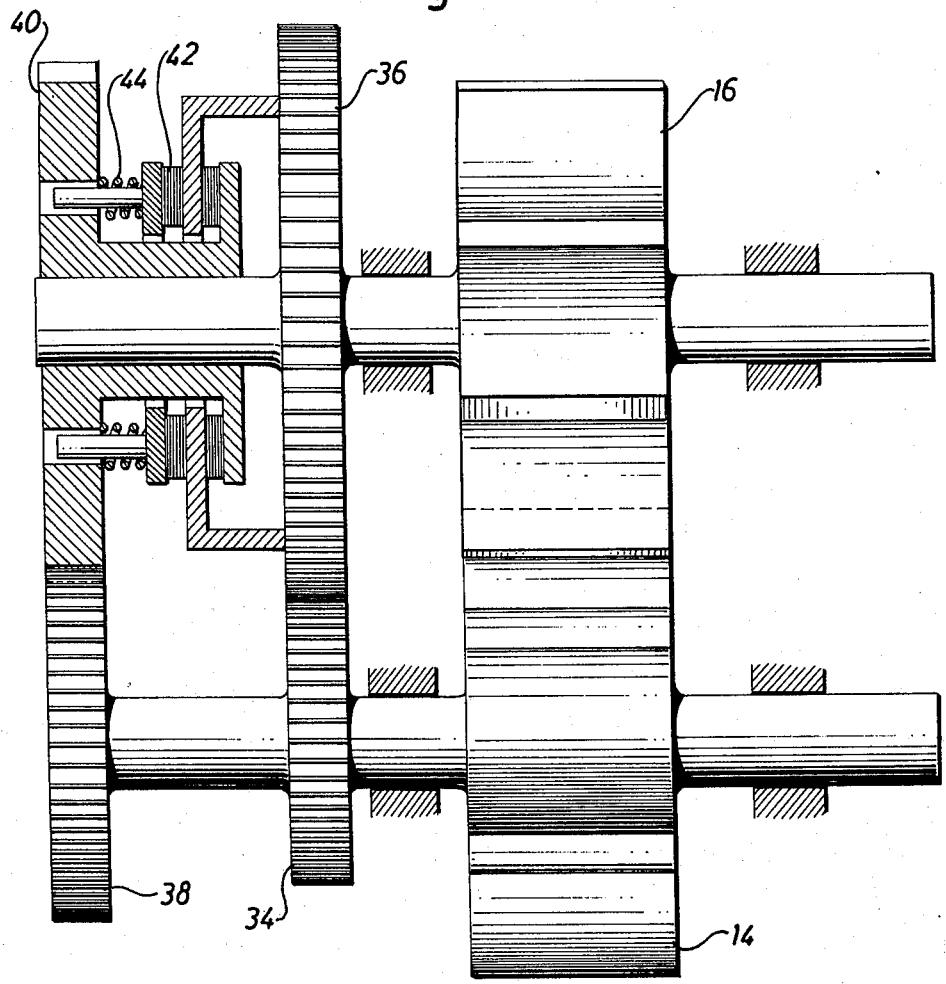
FIG. 3 shows a diagrammatic longitudinal section taken along line 3—3 in FIG. 1.

The engine shown in FIGS. 1, 2 and 3 comprises a stationary casing 10 enclosing a working space 12 composed of two intersecting cylindrical bores. A power rotor 14 and a rotary abutment member 16 intermeshing therewith are mounted in the casing 10 and disposed within the working space 12. The rotary abutment member 16 is provided with eight grooves 18 and intervening lands 20 completely located inside the pitch circle of the member. An axially extending sealing strip 22 is carried in a slot 24 in the edge portion of each groove flank 26 and biased out of the slot 24 in a direction having a peripheral and a radial component (FIG. 2). The power rotor 14 is provided with four lands 28 and intervening grooves 30 completely located outside the pitch circle of the rotors. Each flank 32 of the power rotor lands 28 follows a curve generated by the edge portion of the cooperating abutment member flank 26 as the rotor 14 and the abutment member 16 rotate. The sealing strip 22 carried in the abutment member 16 is then during the intermesh period biased into direct contact with the power rotor flank 32 and slides along the flank 32 from one radial extremity thereof to the other.

The power rotor 14 and the abutment member 16 are each provided with a gear 34, 36 coaxially and non-rotatably fixed thereto. Those gears 34, 36 intermesh and each has a pitch radius exactly coinciding with that of the power rotor 14 and the rotary abutment member 16, respectively, to which it is fixed. Each of the gears 34, 36 are provided with a number of teeth being a high multiple of the number of lands 28, 20 of the related rotor 14 and abutment member 16, respectively. The gears 34, 36 are further fixed on their shafts in such a way that when they contact each other on one side of each tooth corresponding to drive of the abutment member 16 in forward direction by means of the power rotor 14 the lands 28 of the power rotor 14 are located exactly in the middle of the grooves 18 of the abutment member 16 at full intermesh therebetween.

The gear transmission between the power rotor 14 and the abutment member 16 further comprises a second pair of intermeshing gears 38, 40. One gear 38 of this second pair having a somewhat larger pitch radius than that of the gear 34 coaxially and non-rotatably fixed to the power rotor 14 and intermeshes with the gear 40 coaxially and rotatably mounted on the abutment member 16. The gear 40 is connected with the abutment member 16 by means of a friction clutch 42 continuously kept in engaged position by springs 44. The gear 40 thus rotates somewhat faster than the coaxial gear 36 resulting in a certain slip in the clutch 42. However, the clutch 42 all the time transfers enough torque to keep the gears 34, 36 in the desired relative intermesh position thus overcoming any tendency to start an oscillation of the abutment member 16 relative to the power rotor 14.

Figure 4:
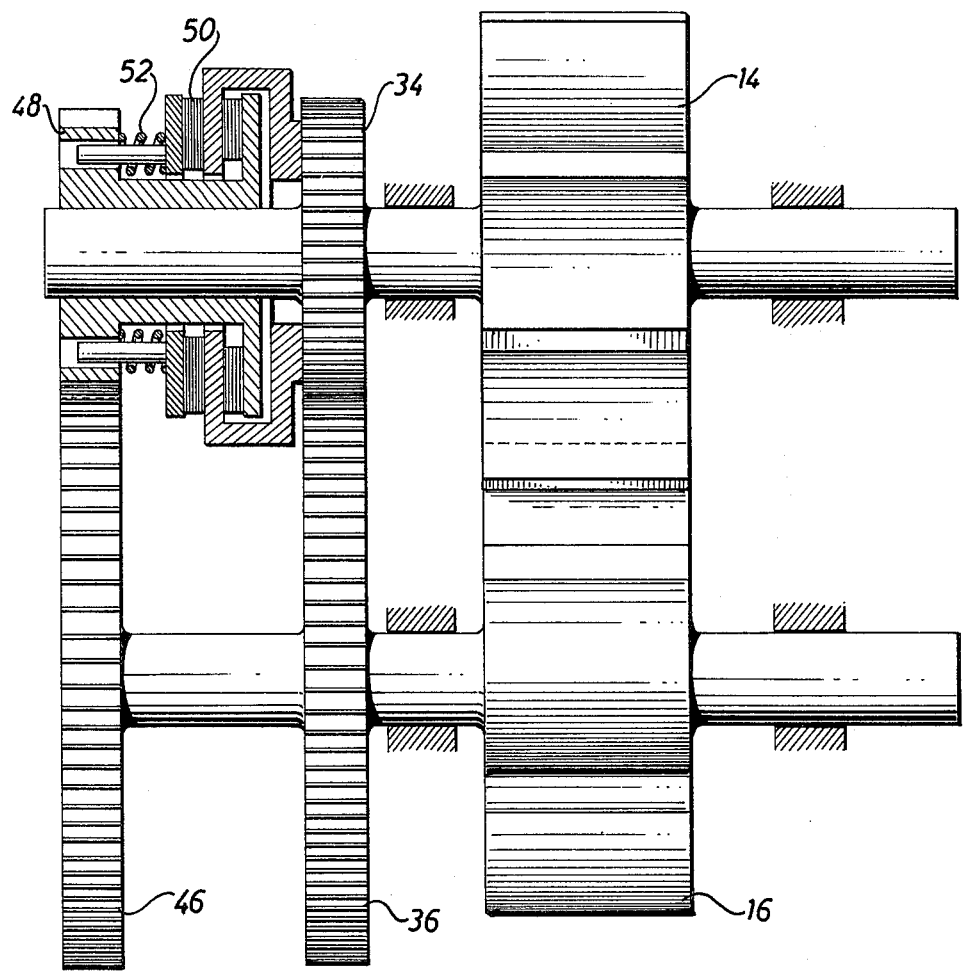
FIG. 4 shows a diagrammatic longitudinal section similar to FIG. 2 through another engine.

FIG. 4 shows a modification of the embodiment shown in FIG. 3 in that the second pair of gears 46, 48 in the gear transmission between the power rotor 14 and the abutment member 16 comprises one gear 46 coaxially and non-rotatably fixed to the abutment member 16 and having a somewhat larger pitch radius than the gear 36 coaxial therewith and intermeshes with the gear 48 coaxially and rotatably mounted on the power rotor 14. The gear 48 is connected with the power rotor 14 by means of a friction clutch 50 kept in engaged position by means of springs 52. When using this type of second gear train the gears 34, 36 of the first gear train shall be angularly adjusted relative the power rotor 14 and the abutment member that the gears 34, 36 contact each other corresponding to drive of the power rotor 14 in forward direction by means of the abutment member 16 simultaneously as the power rotor land 28 is located in the middle of the abutment member groove 18 at full intermesh therebetween.

Independent of which type of gear transmission that is used the torque transmitted through the clutch 42, 50 should be just as large as necessary to keep the gears 34, 36 in a fixed angular relation independent of the torque variations of the abutment member 16 in the direction opposite to that of the torque transmitted through the clutch. As those torque variations in the specific type of machine normally are very small the difference in gear ratio between the different gear trains and the dimensions of the clutch 42, 50 can be kept rather small so that the relative speed between the clutch surfaces between which the slip takes place can be kept on a very low value. Simultaneously the springs 44, 52 can be made so weak that the contact pressure in the clutch 42, 50 is also very low. In practice the wear and consequently also the power loss is according to tests completely negligible.

I claim:

1. In an internal combustion engine of the type comprising a grooved power rotor; a grooved rotary abutment member intermeshing with the power rotor; a power shaft nonrotatably connected with the power rotor; and said abutment member being subjected to a periodically varying torque which at least in one direction has a small amplitude from the zero torque value and carrying movable sealing means biased into contact with the flanks of the power rotor grooves;
   means for maintaining continuous contact between flanks of the power rotor and cooperating sealing means carried by the abutment member, comprising:
   a first pair of intermeshing gears nonrotatably connected with the power rotor and the rotary abutment member, respectively, and having exactly the same gear ratio as the intermeshing power rotor and abutment member;
   a second pair of intermeshing gears; and
   a friction clutch rotatably connecting one gear of said second pair of intermeshing gears with one of the power rotor and the abutment member;
   the other gear of said second pair of intermeshing gears being nonrotatably connected with the other one of said power rotor and abutment member; said second pair of intermeshing gears having a gear ratio differing from that of said first pair of intermeshing gears so that the torque transmitted through said friction clutch is larger than said small amplitudes of the torque of the abutment member.

2. Apparatus as defined in claim 1, in which said second pair of intermeshing gears has a lower gear ratio than that of said first pair of intermeshing gears.

3. Apparatus as defined in claim 1 wherein said friction clutch connects said one gear of said second pair of intermeshing gears with said abutment member.

4. Apparatus as defined in claim 3, in which said friction clutch is carried on said abutment member.

* * * * *